US011524557B2

(12) United States Patent
Ma et al.

(10) Patent No.: US 11,524,557 B2
(45) Date of Patent: Dec. 13, 2022

(54) VEHICLE ANTIGLARE SYSTEM AND METHOD AND VEHICLE COMPRISING ANTIGLARE SYSTEM (71) Applicant: BOE Technology Group Co., Ltd., Beijing (CN)

(72) Inventors: Xitong Ma, Beijing (CN); Tianyue Zhao, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 144 days.

(21) Appl. No.: 16/759,386

(22) PCT Filed: Mar. 29, 2019

(86) PCT No.: PCT/CN2019/080595
§ 371 (c)(1),
(2) Date: Apr. 27, 2020

(87) PCT Pub. No.: WO2019/185050
PCT Pub. Date: Oct. 3, 2019

(65) Prior Publication Data
US 2020/0290440 A1 Sep. 17, 2020

(30) Foreign Application Priority Data

Mar. 29, 2018 (CN) .......................... 201810272960.1

(51) Int. Cl.
*B60J 3/04* (2006.01)
*B60J 1/02* (2006.01)
(Continued)

(52) U.S. Cl.
CPC ................... *B60J 3/04* (2013.01); *B60J 1/02* (2013.01); *B60J 1/08* (2013.01); *B60R 11/04* (2013.01);
(Continued)

(58) Field of Classification Search
CPC ............... B60J 3/04; B60J 3/007; B60J 11/04
(Continued)

(56) References Cited

U.S. PATENT DOCUMENTS 9,702,183 B1    7/2017 Ochiai et al.
2010/0276962 A1* 11/2010 Zhang ........................ B60J 3/00
296/97.2
(Continued)

FOREIGN PATENT DOCUMENTS

CN      103273826 A    9/2013
CN      103985334 A    8/2014
(Continued)

OTHER PUBLICATIONS

Office Action for corresponding Chinese Application 201810272960.1 dated May 8, 2020.
Office Action for corresponding Chinese Application 201810272960.1 dated Sep. 21, 2020.

*Primary Examiner* — D Glenn Dayoan
*Assistant Examiner* — Kevin P Weldon
(74) *Attorney, Agent, or Firm* — ArentFox Schiff LLP; Michael Fainberg (57) ABSTRACT An antiglare system and method and a vehicle comprising the antiglare system. The antiglare system comprises a light transmittance adjustment plate, which includes at least one light transmittance adjustment portion, which in turn includes at least one first light transmittance adjustment region. The antiglare method comprises: capturing, from one side of a light transmittance adjustment plate, an image in a direction facing the light transmittance adjustment plate; determining a bright region in the image, and acquiring a position of the bright region in the image; determining, according to the position of the bright region, a first light transmittance adjustment region in the light transmittance adjustment plate; and if a bright region is present, adjusting (Continued)

light transmittance of the first light transmittance adjustment region. The antiglare system dynamically adjusts, according to different situations, light transmittance at different regions in a light transmittance adjustment plate, thereby adaptively adjusting light conditions.

6 Claims, 5 Drawing Sheets

(51) Int. Cl.
    *B60J 1/08*         (2006.01)
    *B60R 11/04*      (2006.01)
    *G02F 1/133*      (2006.01)
    *G06V 10/25*      (2022.01)

(52) U.S. Cl.
    CPC .......... *G02F 1/13318* (2013.01); *G06V 10/25* (2022.01)

(58) Field of Classification Search
    USPC ....................................................... 296/97.2
    See application file for complete search history.

(56) References Cited

U.S. PATENT DOCUMENTS

| | | | |
|---|---|---|---|
| 2016/0339768 A1* | 11/2016 | Ro | G06K 9/00825 |
| 2016/0363993 A1 | 12/2016 | Leng | |
| 2018/0043756 A1 | 2/2018 | Kaphengst et al. | |
| 2018/0089516 A1* | 3/2018 | Govindasamy | H04N 5/2252 |
| 2018/0204538 A1* | 7/2018 | Reckamp | B60K 35/00 |
| 2020/0039328 A1* | 2/2020 | Rakoczi | G02F 1/29 |
| 2020/0039334 A1* | 2/2020 | Wu | G02F 1/155 |
| 2020/0047465 A1* | 2/2020 | Manz | B32B 17/10357 |
| 2020/0150462 A1* | 5/2020 | Cermak | G02F 1/0121 |
| 2020/0290439 A1* | 9/2020 | Witte | B60J 3/0204 |
| 2020/0298677 A1* | 9/2020 | Katsura | E06B 9/24 |

FOREIGN PATENT DOCUMENTS

| | | |
|---|---|---|
| CN | 105929576 A | 9/2016 |
| CN | 106143072 A | 11/2016 |
| CN | 106985640 A | 7/2017 |
| CN | 107719083 A | 2/2018 |
| DE | 102011010947 A1 | 8/2012 |
| JP | 2002202486 A | 7/2002 |
| JP | 2008284914 A | 11/2008 |
| WO | 2017053040 A1 | 3/2017 |

* cited by examiner

ND VEHICLE COMPRISING
VEHICLE ANTIGLARE SYSTEM AND METHOD AND VEHICLE COMPRISING ANTIGLARE SYSTEM

This disclosure is a US National Stage of International Application No. PCT/CN2019/080595, filed Mar. 29, 2019, which claims priority to Chinese Patent Application No. 201810272960.1 filed with Chinese Patent Office on Mar. 29, 2018, entitled "Light Adjusting System and Method and Vehicle Comprising Light Adjusting System", which is incorporated herein by reference in its entirety.

FIELD

The present disclosure relates to the field of intelligent light adjustment technology, and particularly to a vehicle antiglare system and method, and a vehicle comprising the antiglare system.

BACKGROUND

When a driver drives through a traffic-light intersection, if the sun or a vehicle lamp and traffic light ahead are in the same direction with respect to the driver, and the sunlight or the light from the vehicle lamp ahead is strong and unpleasant to the eyes, the driver is very likely to be unable to see clearly the status of the traffic light in front of him due to the intense light from the sun or the vehicle lamp ahead. Once the driver does not see the traffic light in front of him clearly when the traffic light is in a red light state, and then he continues to drive forward when traffic is prohibited, a traffic accident is very likely to occur.

Light in a viewing range is often adjusted overall in the prior art. For example, a driver often wears sunglasses to avoid the interference of strong light, but this may cause chromatic aberration in the colors of the traffic lights and still has a potential safety risk.

SUMMARY

The embodiments of the present disclosure provide an antiglare system and method and a vehicle including the antiglare system, to solve the problem in the prior art that overall adjustment of light within a viewing range causes light that does not needs adjustment to be also adjusted.

To achieve the above object, the embodiments of the present disclosure adopt the following technical solutions.

In a first aspect, an embodiment of the present disclosure provides an antiglare method for a vehicle antiglare system. The antiglare system includes a light transmittance adjustment plate, the light transmittance adjustment plate includes at least one light transmittance adjustment portion, and each light transmittance adjustment portion includes at least one first light transmittance adjustment region. The method includes: an image capturing step: capturing, from one side of the light transmittance adjustment plate, an image in a direction facing the light transmittance adjustment plate; a bright region identifying step: identifying a bright region in the image, and obtaining a position of the bright region in the image; a light transmittance adjustment region obtaining step: obtaining, according to the position of the bright region, the first light transmittance adjustment region in the light transmittance adjustment plate; and a light transmittance adjusting step: when a bright region is present, adjusting light transmittance of the first light transmittance adjustment region.

In a second aspect, an embodiment of the present disclosure provides a vehicle antiglare system. The antiglare system includes: a light transmittance adjustment plate including at least one light transmittance adjustment portion, each light transmittance adjustment portion including at least one first light transmittance adjustment region, wherein light transmittance of the first light transmittance adjustment region is adjustable; a camera device configured to capture, from one side of the light transmittance adjustment plate, an image in a direction facing the light transmittance adjustment plate; and a processing device configured to identify a bright region in the image, and obtain a position of the bright region in the image; obtain, according to the position of the bright region, the first light transmittance adjustment region in the light transmittance adjustment plate; and when a bright region is present, adjust light transmittance of the determined first light transmittance adjustment region.

In a third aspect, an embodiment of the present disclosure provides a vehicle including any antiglare system describe above, wherein the light transmittance adjustment plate of the antiglare system is a part of vehicle glass.

In the antiglare system with a light transmittance adjustment plate and the method provided in the embodiments of the present disclosure, an image is captured in real time, a bright region (such as a region of visual interference by the sun, a vehicle lamp or other illuminant) is identified from the image, light transmittance adjustment region to be adjusted (a first light transmittance adjustment region and/or a second light transmittance adjustment region) in the light transmittance adjustment plate is obtained according to a position of the bright region in the image, and light transmittance of the light transmittance adjustment region in the light transmittance adjustment plate is adjusted, so that a glare effect can be accurately prevented. Compared with the prior art, the antiglare system provided in the embodiment of the present disclosure can adjust, according to different situations, light transmittance at different positions or regions in the light transmittance adjustment plate, thereby adaptively adjusting light conditions, thus solving the problem in the prior art that overall adjustment of light within a viewing range causes light that does not needs adjustment to be also adjusted.

BRIEF DESCRIPTION OF THE DRAWINGS

In order to describe technical solutions in the embodiments of the present disclosure more clearly, drawings that need to be used in description of the embodiments or the prior art will be introduced briefly below. Obviously, the drawings described below are merely some embodiments of the present disclosure, and those of ordinary skill in the art can obtain other drawings according to these drawings without any inventive skill.

DETAILED DESCRIPTION

Technical solutions in the embodiments of the present disclosure will be described clearly and completely below with reference to drawings for the embodiments of the present disclosure. Obviously, the embodiments described herein are merely some instead of all of the embodiments of the present disclosure. All other embodiments obtained by those of ordinary skill in the art on the basis of the embodiments in the present disclosure without inventive work shall fall into the protection scope of the present disclosure.

To facilitate describing the technical solutions of the embodiments of the present disclosure clearly, in the embodiments of the present disclosure, words such as "first" and "second" are used to distinguish identical or similar items having substantially same functions or effects. Those skilled in the art can understand that the words such as "first" and "second" do not limit the quantity and execution order.

As used herein, the term "and/or" merely represents an association relationship describing associated objects, indicating there may be three relationships. For example, A and/or B may indicate three situations: A exists alone; both A and B exist; and B exists alone. In addition, the character "/" herein generally indicates that the associated objects prior to and following it are in an "or" relationship.

Figure 1:
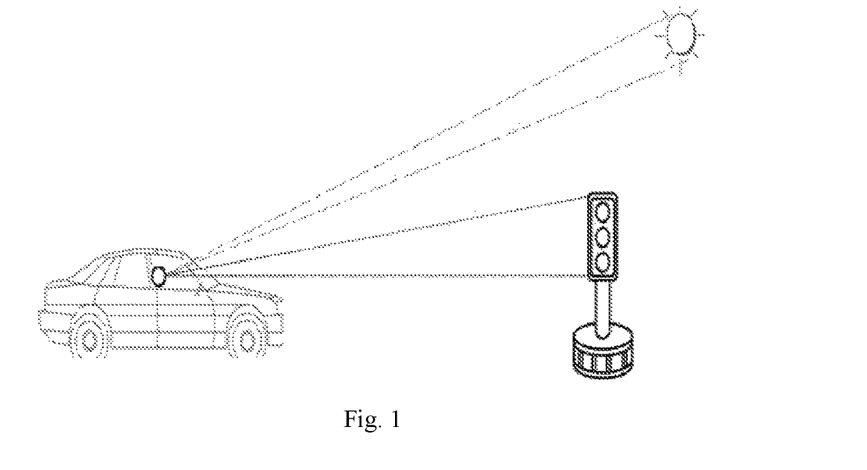
FIG. 1 is a schematic diagram of a scenario when a driver faces the sun and traffic lights.

Referring to FIG. 1, when a driver drives through a traffic-light intersection, if the sun and the traffic light are in the same direction with respect to the driver, the strong light of the sun passes through front windshield glass of the vehicle (windshield glass installed in the window of the front windshield) and shines on the driver's eyes, causing a glare effect, which may influence the driver's judgment on the state of traffic light, so the driver is very likely be unable to determine the state of the traffic light. In view of such similar situations as described above, the embodiment of the present disclosure can improve the front windshield of the vehicle, and solve the aforementioned problems by adjusting light transmittance at different positions (in different regions) of the front windshield.

Embodiment 1: Antiglare System

Figure 2:
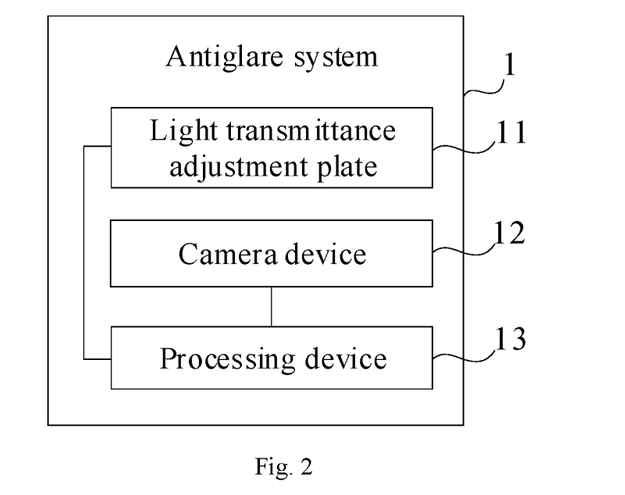
FIG. 2 is a schematic diagram of an antiglare system provided in an embodiment of the present disclosure.

The embodiment of the present disclosure provides an antiglare system 1. As shown in FIG. 2, the antiglare system 1 includes a light transmittance adjustment plate 11, a camera device 12, and a processing device 13.

Light Transmittance Adjustment Plate

Figure 3:
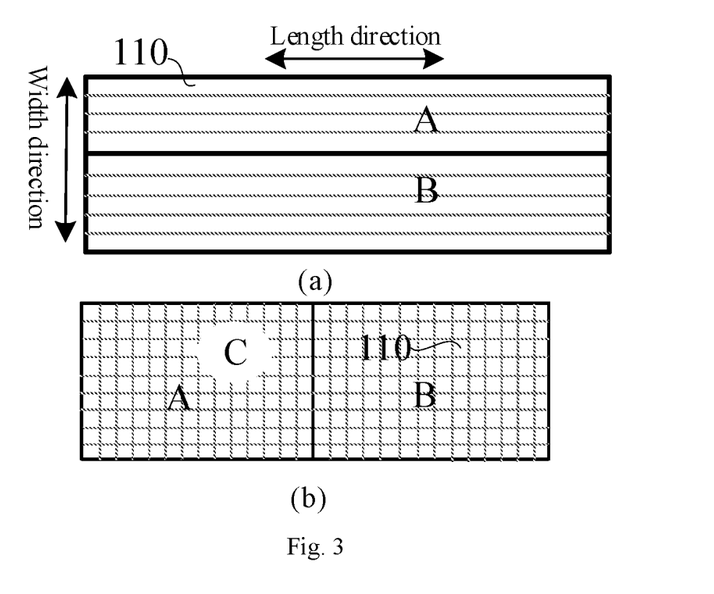
FIG. 3 is a schematic diagram of a light transmittance adjustment plate in the antiglare system provided in FIG. 2.

The light transmittance adjustment plate 11 may include at least one light transmittance adjustment portion, and the at least one light transmittance adjustment portion may be distributed along an extending direction of the light transmittance adjustment plate 11. The light transmittance (also referred to as visible light transmittance) of each light transmittance adjustment portion is adjustable, for example, as shown in FIG. 3, light transmittance adjustment portions A and B. Each light transmittance adjustment portion may include a plurality of adjustment units, which can adjust the amount of transmitted light, so each adjustment unit may be called a "light valve".

The plurality of adjustment units may be a plurality of repeatedly arranged units included in the light transmittance adjustment plate 11 and are distributed at different positions in the extending direction of the light transmittance adjustment plate 11 so that the light transmittance at different positions can be adjusted. Exemplarily, as shown in FIG. 3, a plurality of adjustment units 110 may be successively arranged in one dimension of the extending direction of the light transmittance adjustment plate 11, and each adjustment unit 110 may be a strip; and the width direction of each adjustment unit 110—is consistent with the dimensional direction in which the plurality of adjustment units 110 are successively arranged, and the length direction of the adjustment unit 110 can be parallel to one side of the light transmittance adjustment plate 11. Exemplarily, as shown in FIG. 3 (b), a plurality of adjustment units 110 may be successively arranged in two dimensions of the extending direction of the light transmittance adjustment plate 11, and each adjustment unit 110 may be square.

As an optional implementation, when the above antiglare system is applied to a vehicle, the light transmittance adjustment plate 11 may be a part of vehicle glass, such as being attached to an inner surface (that is, a surface facing the interior of the car) of windshield glass of a front window of the vehicle (which may be called front windshield glass), and at least covering a portion of the front windshield glass in front of the driver's seat. Exemplarily, the "attach" means that the light transmittance adjustment plate 11 may be adhered to the inner surface of the front windshield glass without any gap, along the curvature of the front windshield glass of the vehicle, and may also be fixed to the inner surface of the front windshield glass with a gap, along the curvature of the front windshield glass, wherein they may be fixed together by a connecting structure located on edges of the light transmittance adjustment plate 11, and the connecting structure may be a clamping structure, etc.; the edges of the light transmittance adjustment plate 11 may also be bonded to the front windshield glass of the vehicle; and multiple adjustment units may also be fabricated directly on the inner surface of the vehicle windshield glass (that is, the windshield glass of the vehicle is used as a substrate) to form an integrated vehicle windshield glass and adjustment panel. Exemplarily, the light transmittance adjustment plate 11 may completely cover the front windshield glass, and may also only cover a portion of the front windshield glass in front of the driver's seat, which is not limited in the embodiment of the present disclosure. Compared with the prior art, in the embodiment of the present disclosure, the light transmittance adjustment plate 11 is attached to the inner surface of the front windshield glass, which can achieve the effect of adaptively adjusting the light by controlling the light transmittance of the adjustment units of the light transmittance adjustment plate 11 at different positions.

As another optional implementation, the light transmittance adjustment plate 11 may be installed at the window of the front windshield of the vehicle, for closing the window; that is, the light transmittance adjustment plate 11 is used in place of the vehicle front windshield glass in the prior art. Exemplarily, in respect of performance parameters (drag coefficient and ultraviolet protection factor) of the light transmittance adjustment plate 11 can reach the level of the front windshield glass in the prior art or be better than the prior art, and thus can be installed directly at the window of the front windshield of the vehicle and directly used as the front windshield glass of the vehicle. In this case, the light transmittance adjustment plate 11 not only has the windshielding effect of the traditional windshield glass, but also has the performance of adjustable light transmittance of the adjustment units at different positions (different regions in the light transmittance adjustment plate 11); and the experience of a user is improved.

The above light transmittance adjustment plate 11 may have the light transmitting property like glass, and has a light transmittance in a specific range (for example, 50% to 95%). The light transmittance is closely related to its special material, structure and installation.

As an optional implementation, the light transmittance adjustment plate 11 may be a transparent display screen. In this case, the light adjustment unit may be referred to as a pixel unit or a sub-pixel unit. Exemplarily, the transparent display screen includes liquid crystals, which are twisted in an electric field to achieve the function of an optical switch, and control the light throughput. When external light passes through liquid crystal molecules, a different arrangement and twisted state of the liquid crystal molecules leads to a different amount of light passing therethrough, so that a bright and dark change is achieved, and an image may be reproduced. The degree of twisting of the liquid crystal molecules is determined by the magnitude of a voltage difference across the liquid crystal molecules. Thus, electrical to optical conversion can be achieved in this way. That is, the light throughput is controlled by the magnitude of the voltage, so that an electrical signal is converted into an image. For the structure of the transparent display screen, reference may be made to the prior art, and it is not described in detail here. The transparent display screen may not include a color film (color filter). Of course, it is also possible to include a color filter according to the actual need.

Specifically, the light transmittance adjustment portion may include a first light transmittance adjustment region and a second light transmittance adjustment region, wherein the first light transmittance adjustment region corresponds to a bright region, and the second light transmittance adjustment region corresponds to a region other than the bright region; that is, as the bright region changes, positions and areas of the first light transmittance adjustment region and the second light transmittance adjustment region within the light transmittance adjustment portion also change continuously. Exemplarily, as shown in FIG. 3 (*b*), in the light transmittance adjustment portion A, a white circular bright region C is the first light transmittance adjustment region, and a region other than the white circular bright region C is the second light transmittance adjustment region. Specifically, by adjusting the adjustment units in the first light transmittance adjustment region and the second light transmittance adjustment region, the light transmittance of the first light transmittance adjustment region and the second light transmittance adjustment region may be changed, so that the light transmittance of different regions in the light transmittance adjustment portion is different.

Camera Device

The camera device 12 may be configured to capture, from one side of the light transmittance adjustment plate 11, an image in a direction facing the light transmittance adjustment plate 11. Exemplarily, the camera device 12 may be installed in the driver's cab of the vehicle, and capture images from the driver's cab toward the direction of the front windshield of the vehicle (i.e. toward the light transmittance adjustment plate 11). For example, to ensure the using effect of the antiglare system 1, the camera device 12 may be disposed at a position where the eyes of the driver are looking forward, so that the range of captured images is same as or approximately same as the driver's viewing range.

As an optional implementation, the antiglare system 1 further includes a head-mounted device, and the camera device 12 may be mounted on the head-mounted device. Exemplarily, the camera device 12 includes a camera, and the head-mounted device may be glasses, a helmet, a head band or the like. Using glasses as an example, the glasses may be glasses with lenses, and may also be glasses without lenses, and the camera is mounted on the glasses. For example, dual cameras may be used, which are respectively mounted on two glass frames (for example, at symmetrical positions such as on two sides of the upper edge or on left and right edges); and a single camera may also be used, which is mounted at any position on the glass frames. The driver may wear the glasses when driving, so that the camera captures images in real time toward the light transmittance adjustment plate 11.

Processing Device

The processing device 13 may be configured to identify a bright region in the image captured by the camera device 12, and obtain a position of the bright region in the image.

Exemplarily, the processing device 13 may be arranged independently from the camera device 12, and may also be formed integrally with the camera device 12. After receiving the image captured by the camera device 12, the processing device 13 analyzes the image to identify a bright region from it. Exemplarily, the bright region may be a pattern region (bright spot) generated by a brighter object illuminating on the light transmittance adjustment plate 11, such as a sun pattern region or a car light pattern region. In an actual scenario, light in such region on the light transmittance adjustment plate 11 may interfere with the driver's vision. In this case, the brightness of the light in this region is expected to be reduced.

As an optional implementation, the processing device 13 may be configured to compare pixel values in the image with a preset threshold range, and when pixel values of a plurality of adjacent pixels in the image are within the preset threshold range, identify a region where the plurality of adjacent pixels are located as the bright region in the image. Specifically, the above plurality of pixels may at least include one, or several, dozens, hundreds, thousands or other numbers of pixels. The specific number may be determined according to the requirement on the size of a light adjustment region in actual applications. Specifically, in the set threshold range, the threshold range of each component of RGB is in a relatively high range. The brightness levels of RGB components defined in the current industry standard include a total of 256 levels from 0 to 255. Further, exemplarily, in the implementation, the threshold ranges of the RGB components may be set to 229-255; when the RGB components of a pixel are within the above threshold ranges, the brightness of the pixel is large, and a region corresponding to the pixels with large brightness is the bright region. In this case, the bright region identified from the image may actually also be called a glare region or an exposure region. Generally, it is an image region formed by a relatively bright light emitting body such as the sun.

Exemplarily, during actual processing, the processing device 13 may compare the pixel value of each pixel in the image with the preset threshold range to identify the bright region. It may also extract a plurality of pixel samples by using a systematic sampling method, and compare the pixel values of the pixel samples with the preset threshold range. In this case, based on the samples, when the pixel values of a plurality of adjacent pixels in the sample are within the preset threshold range, a region containing the plurality of pixel samples may be identified as the bright region in the image.

Exemplarily, during actual processing, the process of comparing a pixel value of a pixel in the image with a preset threshold range may specifically include: comparing component values of three colors RGB of the pixel with preset threshold ranges of RGB components respectively; and when the component values of the three colors RGB of the pixel are respectively within the preset threshold ranges of the RGB components, determining that the pixel is a pixel whose pixel value is within the preset threshold range. For example, the threshold range of the R component is S1, the threshold range of the G component is S2, and the threshold range of the B component is S3. In this case, when an R component value, a G component value, and a B component of a pixel are respectively within S1, S2, and S3, the pixel value of the pixel is regarded as within the preset threshold range.

Figure 4:
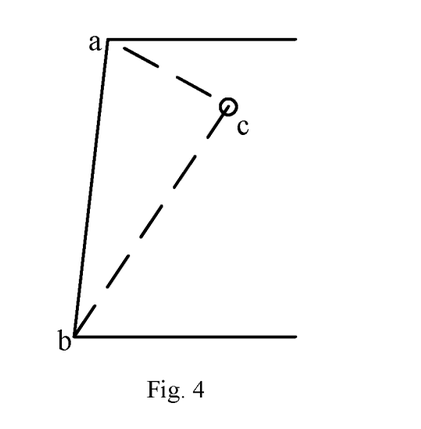
FIG. 4 is a schematic diagram of a method for calculating a position of a bright region in an image provided in an embodiment of the present disclosure.

As an optional implementation, the processing device 13 may be configured to: obtain a position of a boundary of the light transmittance adjustment portion or a position of a mark of the light transmittance adjustment portion in the image; and obtain a position of the first light transmittance adjustment region in the light transmittance adjustment portion or the light transmittance adjustment plate according to the position of the boundary of the light transmittance adjustment portion or the position of the mark of the light transmittance adjustment portion in the image, and the position of the bright region in the image. Exemplarily, as shown in FIG. 4, when an entire left boundary of the light transmittance adjustment portion (that is, a line segment ab formed by an end point a and an end point b) is recognized from the image, and a bright region c (for example, with its center as a reference) in the image and the entire left boundary ab approximately form a triangle, then the processing device 13 may calculate a position of the bright region c relative to the boundary ab of the light transmittance adjustment portion according to a triangle relationship, and may further determine a position of the first light transmittance adjustment region in the light transmittance adjustment portion or the light transmittance adjustment plate 11. Exemplarily, a light transmittance adjustment region covered by the bright region is the first light transmittance adjustment region to be determined.

Figure 5:
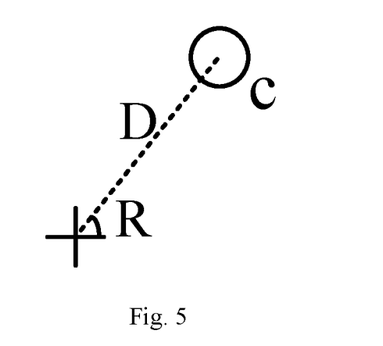
FIG. 5 is a schematic diagram of a method for calculating a position of a bright region in an image provided in another embodiment of the present disclosure.

As an optional implementation, the processing device 13 may be configured to: identify a reference mark (for example, a mark +) of the light transmittance adjustment portion from the image, and obtain a position of the bright region, relative to the reference mark of the light transmittance adjustment portion, in the image. Exemplarily, as shown in FIG. 5, the reference mark + may be preset at a specific position in the light transmittance adjustment portion (for example, in an region in front of the driver's seat), wherein the position (for example, coordinates) of the reference mark + is in the light transmittance adjustment portion is known, and the reference mark + is easy to recognize by the processing device 13, but is substantially transparent to the driver, and does not influence the visual effect. In the case where the processing device 13 recognizes the bright region c and the reference mark + from the image, it may calculate a distance D and an angle R of the bright region c (for example, with its center as a reference) in the image with respect to the reference mark +(for example, with its center as a reference), and may further accurately obtain a position of the first light transmittance adjustment region in the light transmittance adjustment portion according to the distance D and the angle R of the bright region c in the image with respect to the reference mark +, and the position coordinates of the reference mark in the light transmittance adjustment portion. Alternatively, exemplarily, a reference mark + is set at two specific positions in the light transmittance adjustment portion, and a bright region c (for example, with its center as a reference) and the two reference marks + form a triangle in the image, then the processing device 13 may calculate a position of the bright region c relative to the two reference marks + according to a triangle relationship, and may further obtain a position of the first light transmittance adjustment region in the light transmittance adjustment portion. Exemplarily, a light transmittance adjustment region covered by the bright region is the first light transmittance adjustment region.

As an optional implementation, after obtaining the position of the first light transmittance adjustment region, the processing device 13 is further configured to adjust light transmittance of the first light transmittance adjustment region, that is, to adjust light transmittance of a region covered by the bright region in the light transmittance adjustment plate 11. Exemplarily, the area of the first light transmittance adjustment region may be larger than or equal to the area of the bright region, that is, the area of the region where the light transmittance is actually adjusted may be larger than or equal to the area of the bright region, so that a glare effect may be effectively prevented.

Specifically, in the foregoing embodiments, adjusting of light transmittance of the first light transmittance adjustment region is to reduce light transmittance of the first light transmittance adjustment region. For example, the light transmittance of the first light transmittance adjustment region is reduced to 50% to reduce the interference of the bright region (glare region) on the driver's vision, so that the driver can view the scene ahead more clearly.

As an optional implementation, the processing device 13 may be further configured to identify a pattern that satisfies a set condition from the image captured by the camera device 12, obtain a position of the pattern in the image, thereby obtain a region covered by the pattern, and adjust light transmittance of the region covered by the pattern. Exemplarily, when the pattern is a traffic-light pattern, the light transmittance of the region covered by the pattern may be increased; for example, the light transmittance may be increased to 98%, so that the driver can view the display of traffic lights more clearly through the light transmittance adjustment plate 11.

Exemplarily, when a bright region (such as a sun pattern region) and a first light transmittance adjustment region corresponding to the bright region are obtained from the image, the processing device 13 is configured to reduce light transmittance of the first light transmittance adjustment region in the light transmittance adjustment plate 11; and/or, when a traffic-light pattern region is obtained from the image, the processing device 13 is configured to increase light transmittance of the region corresponding to the traffic-light pattern region in the light transmittance adjustment plate 11.

As an optional implementation, the processing device 13 may be specifically configured to refresh light transmittance of each adjustment unit in the light transmittance adjustment plate 11 at a preset refresh frequency, so that in each refresh process, light transmittance of the first light transmittance adjustment region in the light transmittance adjustment plate 11 is first light transmittance, and light transmittance of the second light transmittance adjustment region is second light transmittance. The first light transmittance and the second light transmittance are different, and the first transmittance adjustment region is a transmittance adjustment region corresponding to the bright region (referred to as a target transmittance adjustment region), and the second transmittance adjustment region (referred to as a non-target light transmittance adjustment region) is a region in the light transmittance adjustment plate 11 other than the first light transmittance adjustment region. Exemplarily, the processing device 13 may refresh the light transmittance of each light transmittance adjustment region in the light transmittance adjustment plate 11 at a frequency of 60 Hz for example, so that the light transmittance of the target light transmittance adjustment region is adjusted to preset light transmittance; for example, the light transmittance of the target light transmittance adjustment region is reduced from 90% to 60%, and the light transmittance of the non-target light transmittance adjustment region is reset to an initial value (for example, 90%); by periodically refreshing the transmittance of each light transmittance adjustment region of the light transmittance adjustment plate 11 in this way, the effect of adaptively adjusting light in real time can be achieved, thus solving the problem in the prior art that overall adjustment of light within a viewing range causes light that does not needs adjustment to be also adjusted. Exemplarily, the refresh frequency may be consistent with the periodic frequency of capturing images by the camera device.

The aforementioned processing device 13 includes at least one of a central processing unit (CPU), a microcontroller unit (MCU), and a field-programmable gate array (FPGA).

As an optional implementation, the antiglare system 1 further includes a driving circuit configured to receive an instruction for adjusting light transmittance of a corresponding region in the light transmittance adjustment plate 11, and drive, according to the instruction, the processing device 13 to adjust the light transmittance of the corresponding region in the light transmittance adjustment plate 11.

The antiglare system with a light transmittance adjustment plate according to the embodiment of the present disclosure captures an image in real time, identifies a bright region (such as a sun pattern region, a vehicle lamp pattern region, or other region with high brightness which is likely to cause visual interference) from the image, obtains a first light transmittance adjustment region and/or a second light transmittance adjustment region according to a position of the bright region in the image, and adjusts light transmittance of a corresponding light transmittance adjustment region in the light transmittance adjustment plate according to a preset procedure. Compared with the prior art, the antiglare system according to the embodiment of the present disclosure can dynamically adjust light transmittance at different positions or regions of the front windshield of the vehicle according to different situations, so that the effect of adaptively adjusting light can be achieved, thus solving the problem in the prior art that overall adjustment of light within a viewing range causes light that does not needs adjustment to be also adjusted.

Embodiment 2: Vehicle

Correspondingly, an embodiment of the present disclosure provides a vehicle. The vehicle includes the antiglare system 1 described above. Specifically, the light transmittance adjustment plate 11 in the antiglare system 1 is a part of vehicle glass. The type of the vehicle is not limited, and is generally an automotive, and may be a car, a passenger vehicle, a freight vehicle, a bus, or the like.

Exemplarily, the vehicle glass may be at least one of front windshield glass or vehicle door glass.

Embodiment 3: Antiglare Method

Figure 6:
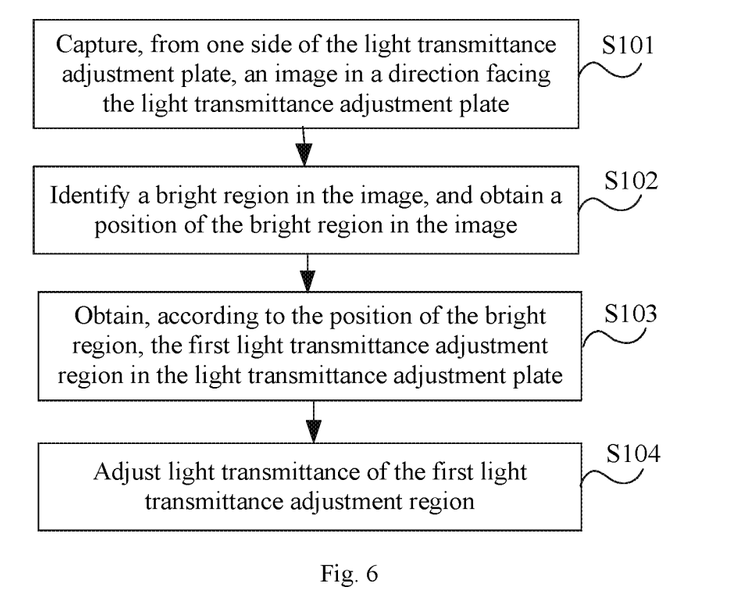
FIG. 6 is a flow diagram of an antiglare method provided in an embodiment of the present disclosure.

Correspondingly, an embodiment of the present disclosure provides an antiglare method. The method may be executed by the aforementioned antiglare system, or a hardware module or a software module in the antiglare system. As shown in FIG. 6, the method includes the following steps.

S101. An image capture step: capturing, from one side of the light transmittance adjustment plate, an image in a direction facing the light transmittance adjustment plate, wherein the light transmittance adjustment plate includes at least one light transmittance adjustment portion distributed along the extending direction of the light transmittance adjustment plate; the light transmittance adjustment portion may include a first light transmittance adjustment region and/or a second light transmittance adjustment region, the first light transmittance adjustment region corresponding to a bright region, and the second light transmittance adjustment region is a region other than the first light transmittance adjustment region; and light transmittance of the first light transmittance adjustment region and/or the second light transmittance adjustment region is adjustable.

As an optional implementation, an image can be captured by a camera device, such as a camera from one side of the light transmittance adjustment plate in a direction facing the light transmittance adjustment plate. Exemplarily, the camera device may be mounted on a head-mounted device. Exemplarily, the head-mounted device may be glasses.

As an optional implementation, the light transmittance adjustment plate may be a transparent display screen.

As an optional implementation, the light transmittance adjustment plate may be attached to an inner surface of windshield glass of a front window of the vehicle, and at least covers a portion of the windshield glass of a front window located in front of the driver's seat.

As another optional implementation, the light transmittance adjustment plate may be installed at the window of the front windshield of the vehicle, for closing the window.

S102. A bright region identifying step: identifying a bright region in the image, and obtaining a position of the bright region in the image.

As an optional implementation, step S102 may include: comparing pixel values in the image with a preset threshold value, and when a plurality of pixel values in the image are greater than the threshold value, identifying a region where the plurality of pixel values are located as the bright region.

S103. A light transmittance adjustment region obtaining step: obtaining, according to the position of the bright region, the first light transmittance adjustment region in the light transmittance adjustment plate.

As an optional implementation, step S102 may include: obtaining a position of a boundary of the light transmittance adjustment portion or a position of a mark of the light transmittance adjustment portion in the image; and obtaining a position of the first light transmittance adjustment region in the light transmittance adjustment portion or the light transmittance adjustment plate according to the position of the boundary of the light transmittance adjustment portion or the position of the mark in the light transmittance adjustment portion in the image, and the position of the bright region in the image.

As an optional implementation, a region in the light transmittance adjustment portion covered by the bright region is the first light transmittance adjustment region.

S104. A light transmittance adjusting step: adjusting light transmittance of the determined first light transmittance adjustment region.

As an optional implementation, step S103 may include: reducing the light transmittance of the first light transmittance adjustment region.

As an optional implementation, step S103 may further include: refreshing light transmittance of each adjustment unit in the light transmittance adjustment plate 11 at a preset refresh frequency, so that in each refresh process, light transmittance of the first light transmittance adjustment region in the light transmittance adjustment plate 11 is first light transmittance, and light transmittance of the second light transmittance adjustment region is second light transmittance. The first light transmittance and the second light transmittance are different, and the first transmittance adjustment region is a transmittance adjustment region corresponding to the bright region (referred to as a target transmittance adjustment region), and the second transmittance adjustment region is a region in the light transmittance adjustment plate 11 except for the first light transmittance adjustment region (referred to as a non-target light transmittance adjustment region).

Figure 7:
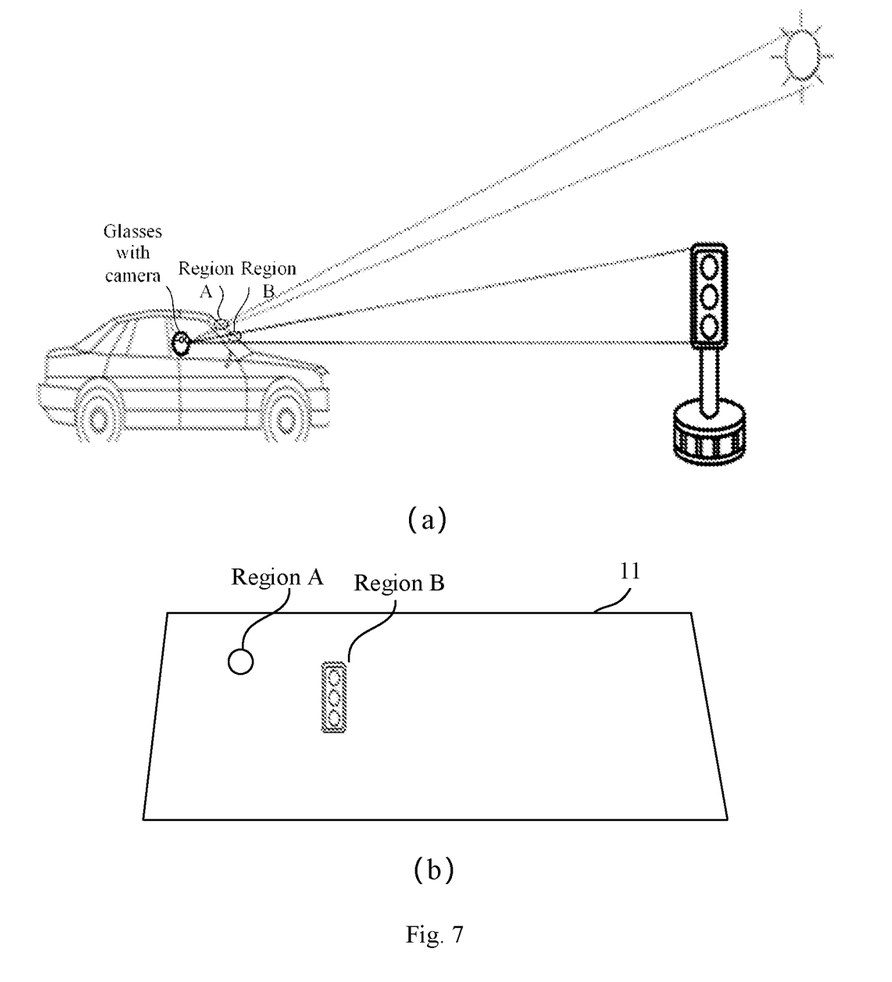
FIG. 7 is a schematic diagram of a scenario when an antiglare method is applied according to an embodiment of the present disclosure.
Figure 8:
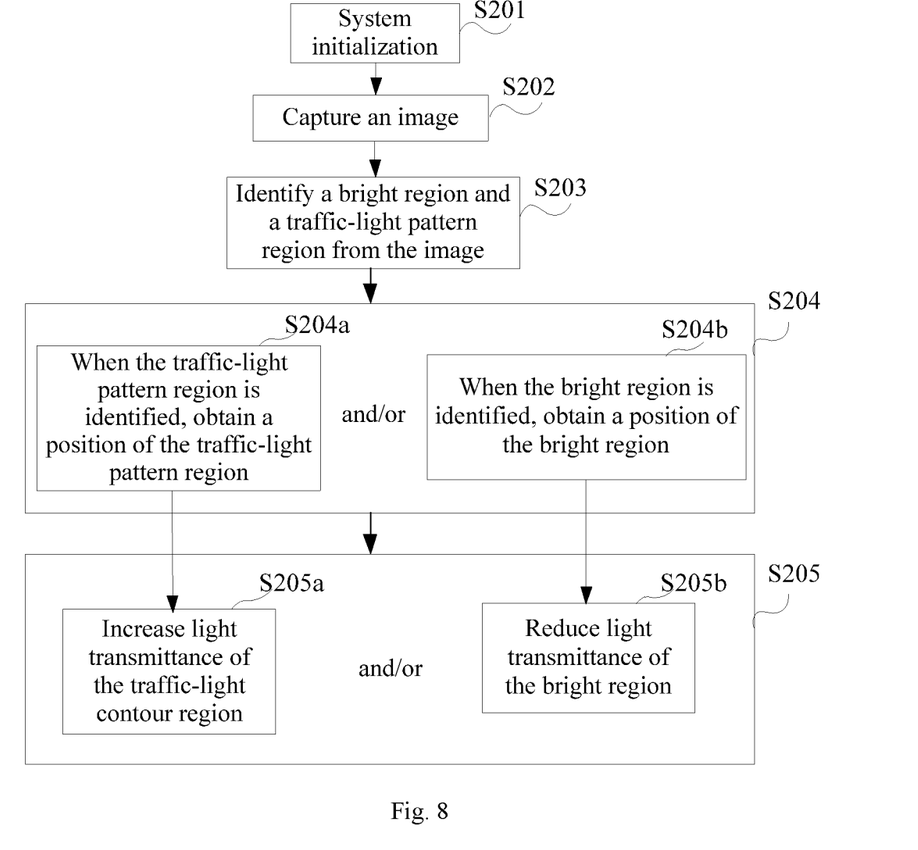
FIG. 8 is a flow diagram of an antiglare method being applied according to an embodiment of the present disclosure.

FIG. 7 is a schematic diagram of a scenario when an antiglare method provided is applied in an embodiment of the present disclosure, showing a side view in (a), and a front view in (b). FIG. 8 is a flow diagram of an antiglare method being applied according to an embodiment of the present disclosure. Implementations of the antiglare method are described below with reference to FIGS. 7 and 8.

Referring to FIG. 7, when a driver drives through a traffic-light intersection, the sun or a vehicle lamp and traffic lights ahead are in the same direction with respect to the driver. In this scenario, an antiglare method provided in an embodiment of the present disclosure is used, as shown in FIG. 8, a process of which is as follows.

S201. System initialization, wherein a light adjustment function is manually activated by the driver, or the light adjustment function is automatically activated at start-up of the vehicle.

S202. A camera device captures an image, as shown in FIG. 7 (a). In this way, the driver needs to wear a head-mounted device (such as glasses) with a camera so as to perform real-time capturing (that is, performing capturing periodically).

S203. The processing device identifies a bright region and a traffic-light pattern region from the image.

S204. The processing device obtains real-time positions of the bright region and the traffic-light pattern region in the image. Taking the bright region identified from the image being a sun pattern region as an example, this step may include the following two cases: S204a. in the case where the traffic-light pattern region is identified from the image, obtaining a position of the traffic-light pattern region in the light transmittance adjustment plate, which corresponds to a region B shown in (a) and (b) of FIG. 7; and S204b. in the case where the bright region is identified from the image, obtaining a position of the bright region in the light transmittance adjustment plate, which corresponds to a region A shown in (a) and (b) of FIG. 7. It should be noted that step S204a and step S204b may be performed separately or simultaneously.

S205. The processing device obtains, according to the positions, a region in the light transmittance adjustment plate of which the light transmittance needs to be adjusted, and adjusts light transmittance of the region of which the light transmittance needs to be adjusted. Corresponding to step S204, this step may include the following two cases: S205a. according to the position of the traffic-light pattern region, correspondingly adjusting (i.e. increasing) light transmittance of adjustment units in the region B enclosed by an contour line of a traffic-light pattern in the light transmittance adjustment plate 11; and S205b. correspondingly adjusting (i.e. reducing) light transmittance of the adjustment units in the bright region A in the light transmittance adjustment plate 11. It should be noted that step S205a and step S205b may be performed separately or simultaneously.

Compared with the prior art, the embodiment of the present disclosure dynamically adjusts light transmittance of a corresponding region in the light transmittance adjustment plate according to an adjustment strategy corresponding to a preset condition, thereby adaptively adjusting light conditions, so that the visual interference of a highly bright light region (such as a region illuminated by the sun or a vehicle lamp ahead) on the driver can be alleviated in the way, and the driver can more clearly see the state of a light region that require attention (such as a region illuminated by traffic lights) through the light transmittance adjustment plate, thus solving the problem in the prior art that overall adjustment of light within a viewing range causes light that does not needs adjustment to be also adjusted.

It should be noted that the functional description of the functional modules involved in the foregoing product embodiments can be referenced to the steps of the corresponding method embodiment, and will not be repeated here. The antiglare method provided in the embodiment of the present disclosure can achieve the same effect as the antiglare system described above.

Based on the foregoing description of the embodiments, those skilled in the art can clearly understand that, for the convenience and brevity of description, the division into the aforementioned functional modules is merely described as an example. In practical applications, the aforementioned functions may be allocated as required to different functional modules; that is, the internal structure of the device is divided into different functional modules to achieve all or part of the functions described above. For working processes of the system, device, and unit described above, reference may be made to the corresponding processes in the foregoing method embodiment, and details are not repeated here.

In the several embodiments provided in the application, it should be understood that the disclosed control device may be implemented in other ways. For example, the device (or system) embodiments described above are only schematic. For example, the division of the units (or modules) is only a logical function division. In actual implementation, there may be other division manners, for example, multiple units or components may be combined or integrated into another system, or some features may be ignored or not implemented. In addition, the mutual coupling or direct coupling or communicative connection as shown or discussed can be achieved by some interfaces, and the indirect coupling or communicative connection between devices or units can be in an electrical, mechanical or other form.

The aforementioned units (or modules) described as separate components may be or may be not physically separate. For example, the functional units in each embodiment of the present disclosure may be integrated in one physical unit or distributed in different physical units; or two or more units may be integrated into one physical unit; or one functional unit may be implemented by cooperation of two or more physical units. The aforementioned integrated unit may be embodied in the form of hardware, or in the form of hardware and software functional units.

The aforementioned integrated unit embodied in the form of a software functional unit may be stored in a computer-readable storage medium. The aforementioned software functional unit is stored in a storage medium and includes a plurality of instructions for causing a computer device to execute some steps of the method described in the embodiments of the present disclosure. The aforementioned storage medium include: a U disk, a mobile hard disk, a read-only memory (ROM), a random access memory (RAM), a magnetic disk, or an optical disc, or other various media capable of storing program codes.

Finally, it should be noted that the foregoing embodiments are only used for illustrating rather than limiting the technical solutions of the present disclosure. Although the present disclosure is described in detail with reference to the foregoing embodiments, those of ordinary skill in the art should understand that they still can make modifications to the technical solutions disclosed in the foregoing embodiments or make equivalent substitutions to some of technical features thereof; and such modifications or substitutions should not cause the essence of the corresponding technical solutions to depart from the spirit and scope of the technical solutions of the embodiments of the present disclosure.

The invention claimed is:

1. An antiglare method for a vehicle antiglare system, wherein an antiglare system comprises a light transmittance adjustment plate, the light transmittance adjustment plate comprising at least one light transmittance adjustment portion, the light transmittance adjustment portion comprising at least one first light transmittance adjustment region, and wherein the method comprises:
   an image capturing step: capturing, from one side of the light transmittance adjustment plate, an image in a direction facing the light transmittance adjustment plate;
   a bright region identifying step: identifying a bright region in the image, and obtaining a position of the bright region in the image;
   a light transmittance adjustment region obtaining step: obtaining, according to the position of the bright region, the at least one first light transmittance adjustment region in the light transmittance adjustment plate; and
   a light transmittance adjusting step: when the bright region is present, adjusting light transmittance of the at least one first light transmittance adjustment region;
   wherein obtaining, according to the position of the bright region, the at least one first light transmittance adjustment region in the light transmittance adjustment plate comprises:
      obtaining a position of a boundary of the light transmittance adjustment portion or a position of a mark of the light transmittance adjustment portion in the image; and
      obtaining a position of the at least one first light transmittance adjustment region in the light transmittance adjustment portion according to the position of boundary of the light transmittance adjustment portion or the position of the mark of the light transmittance adjustment portion in the image, and the position of the bright region in the image;
   wherein identifying the bright region in the image comprises
      comparing pixel values in the image with a preset threshold value, and when a plurality of pixel values in the image are greater than the threshold value, identifying a region where the plurality of pixel values are located as the bright region;
   wherein adjusting light transmittance of the at least one first light transmittance adjustment region comprises: reducing the light transmittance of the at least one first light transmittance adjustment region;
   wherein each light transmittance adjustment portion further comprises: at least one second light transmittance adjustment region, wherein the at least one second light transmittance adjustment region is a region of the light transmittance adjustment portion other than the at least one first light transmittance adjustment region; and
   the light transmittance adjusting step further comprises: adjusting light transmittance of the second light transmittance adjustment region.

2. The antiglare method according to claim 1, wherein the antiglare system is applied to a vehicle, and the light transmittance adjustment plate of the antiglare system is a part of vehicle glass.

3. The antiglare method according to claim 2, wherein the vehicle glass is at least one of front windshield glass or vehicle door glass.

4. A vehicle antiglare system, comprising:
   a light transmittance adjustment plate comprising at least one light transmittance adjustment portion, the light transmittance adjustment portion comprising at least one first light transmittance adjustment region, wherein light transmittance of the at least one first light transmittance adjustment region is adjustable;
   a camera device configured to capture, from one side of the light transmittance adjustment plate, an image in a direction facing the light transmittance adjustment plate; and
   a processing device configured to identify a bright region in the image, and obtain a position of the bright region in the image; obtain, according to the position of the bright region, the at least one first light transmittance adjustment region in the light transmittance adjustment plate; and when a bright region is present, adjust light transmittance of the at least one first light transmittance adjustment region;
   wherein the processing device is configured to:
   obtain a position of a boundary of the light transmittance adjustment portion or a position of a mark of the light transmittance adjustment portion in the image; and
   obtain a position of the at least one first light transmittance adjustment region in the light transmittance adjustment portion according to the position of the boundary of the light transmittance adjustment portion or the position of the mark of the light transmittance adjustment portion in the image, and the position of the bright region in the image;
   wherein the processing device is configured to: compare pixel values in the image with a preset threshold value, and when a plurality of pixel values in the image are greater than the threshold value, identify a region where the plurality of pixel values are located as the bright region;
   wherein the processing device is configured to reduce the light transmittance of the at least one first light transmittance adjustment region;

wherein each light transmittance adjustment portion further comprises: at least one second light transmittance adjustment region, wherein the at least one second light transmittance adjustment region is a region of the light transmittance adjustment portion other than the at least one first light transmittance adjustment region; and the processing device is further configured to adjust light transmittance of the second light transmittance adjustment region.

5. A vehicle comprising the vehicle antiglare system according to claim 4, wherein the light transmittance adjustment plate of the vehicle antiglare system is a part of vehicle glass.

6. The vehicle according to claim 5, wherein the vehicle glass is at least one of front windshield glass or vehicle door glass.

* * * * *